(12) United States Patent
Candillier et al.

(10) Patent No.: US 11,763,953 B2
(45) Date of Patent: Sep. 19, 2023

(54) NUCLEAR REACTOR AND NUCLEAR REACTOR VESSEL EQUIPPED WITH NON-EJECTABLE VALVE

(71) Applicant: Société Technique pour l'Energie Atomique, Villiers le Bacle (FR)

(72) Inventors: Laurent Candillier, Simiane (FR); Michel Brun, Simiane-Collongue (FR)

(73) Assignee: SOCIÉTÉ TECHNIQUE POUR L'ENERGIE ATOMIQUE, Villiers le Bacle (FR)

( * ) Notice: Subject to any disclaimer, the term of this patent is extended or adjusted under 35 U.S.C. 154(b) by 183 days.

(21) Appl. No.: 17/055,407

(22) PCT Filed: May 16, 2019

(86) PCT No.: PCT/EP2019/062677
§ 371 (c)(1),
(2) Date: Nov. 13, 2020

(87) PCT Pub. No.: WO2019/219843
PCT Pub. Date: Nov. 21, 2019

(65) Prior Publication Data
US 2021/0134471 A1     May 6, 2021

(30) Foreign Application Priority Data
May 16, 2018   (FR) ..................... 18 54081

(51) Int. Cl.
*G21C 13/036*     (2006.01)
*G21C 11/08*      (2006.01)
(Continued)

(52) U.S. Cl.
CPC .............. *G21C 11/08* (2013.01); *G21C 15/12* (2013.01); *G21C 13/036* (2013.01); *G21C 15/18* (2013.01)

(58) Field of Classification Search
CPC ...... G21C 15/12; G21C 15/18; G21C 13/036; F16K 17/26; F16K 17/40
See application file for complete search history.

(56) References Cited

U.S. PATENT DOCUMENTS 5,517,538 A * 5/1996 Seidelberger ......... F16K 17/383
                                                137/72
8,833,733 B2 * 9/2014 Bogert ..................... F16L 19/10
                                                251/148
10,026,511 B2 * 7/2018 Malloy, III ........ G21C 13/0285

FOREIGN PATENT DOCUMENTS

DE    3037531 A  *  5/1982  ............. F16K 17/26
DE    3037531 A1    5/1982
JP    S6473296 A    3/1989

OTHER PUBLICATIONS

Corresponding Search report for PCT/EP2019/062677.
Corresponding Search report for FR1854081.

* cited by examiner

*Primary Examiner* — Lily C Garner
(74) *Attorney, Agent, or Firm* — Davidson, Davidson & Kappel, LLC

(57) ABSTRACT

A nuclear reactor vessel includes a shell (5) having a wall (9) traversed by at least one passage (11) having a central axis (C) and a valve (21) mounted in the passage (11), the valve (21) having a determined outer cross-section. The passage (11) has an inner end segment (23) that opens into the inner volume (7) and an outer end segment (25) that opens into an outer piping (13), the valve (21) being housed in the inner end segment (23). The valve (21) is capable of being extracted from the passage (11) through the inside of the vessel (1). The outer end segment (25) has at least one portion having an inner cross-section, perpendicular to the central axis (C), that is smaller than the outer cross-section (Continued)

of the valve (21), such that the valve (21) cannot be ejected out of the vessel (1).

14 Claims, 4 Drawing Sheets

(51) Int. Cl.
    *G21C 15/12*     (2006.01)
    *G21C 15/18*     (2006.01)

NUCLEAR REACTOR AND NUCLEAR REACTOR VESSEL EQUIPPED WITH NON-EJECTABLE VALVE

The present disclosure generally relates to nuclear reactor vessels equipped with safety valves.

The breaking of the primary pipings leading to the pressurized vessel of the reactor, containing the core, is among the accidents studied in the safety report. On large pressurized water nuclear reactors, equipped with one or several primary loops, the breaking of the primary pipings and/or of the connection with the pressurizer remains the determining primary leak event for safety.

For an integral reactor, in which the primary circuit is integrated into the pressurized vessel, only small pipings lead to the vessel. These are typically intended to inject water into the vessel and not to remove it therefrom. These pipings are therefore provided for monodirectional use entering the vessel, for example the Safety Injection lines.

For these integral reactors, it is therefore particularly interesting to have arrangements of the check valve type, making it possible to limit the flow rate of the primary breaches following the breaking of these pipings, and therefore to benefit fully from the concept of the integral reactor.

It is then crucial to be able to demonstrate that this valve device works irrespective of the failure scenario of the piping, and in particular that it cannot be ejected under the action of the primary pressure irrespective of the location of the attack on the piping connected to the pressurized vessel on the one hand, and is located upstream of the first possible or theorized failure zone of the connected line.

BACKGROUND

Patent US2013/0272478 describes a solution making it possible to arrange a valve on a line connected to a pressurized vessel of an integral reactor. This valve is located in a flange attached on the vessel. This arrangement is more favorable with respect to the aim mentioned above than the more conventional solution consisting of arranging the valve on the line, at a distance from the pressurized vessel.

The solution proposed by US2013/02722478 only partially meets the above need. This design implements a flange outside the vessel, the role of which is on the one hand to position this valve and on the other hand to ensure the vessel/piping connection. In the design of US2013/0272478, this flange is essential to be able to visit this valve regularly. If the flange fails, this valve is ejected and no longer performs the isolating function.

SUMMARY

In this context, the present disclosure aims to propose a vessel of a nuclear reactor that does not have the above flaws.

To that end, according to a first aspect, a nuclear reactor vessel is provided comprising:
- a shell delimiting an inner volume, the shell having a wall traversed by at least one passage having a central axis;
- a piping outside the shell and connected to the wall, the piping fluidly communicating with the inner volume through the passage;
- a valve mounted in the passage and provided to selectively block a circulation of fluid between the inner volume and the piping through the passage, the valve having a given outer cross-section perpendicularly to the central axis;

the passage having an inner end segment that opens into the inner volume and an outer end segment that opens into the piping, the valve being housed in the inner end segment;

the inner end segment having, over its entire axial length, an inner cross-section perpendicular to the central axis that is larger than the outer cross-section of the valve, such that the valve is capable of being extracted from the passage through the inside of the vessel;

the outer end segment having at least one portion having an inner cross-section, perpendicular to the central axis, that is smaller than the outer cross-section of the valve, such that the valve cannot be ejected out of the vessel.

Because the inner end segment has, over its entire axial length, an inner cross-section perpendicular to the central axis that is larger than the outer cross-section of the valve, the valve is capable of being extracted from the passage through the inside of the vessel. This makes it possible to perform maintenance and regulatory visits.

Because the outer end segment of the passage has at least one portion having an inner cross-section, perpendicular to the central axis, that is smaller than the outer cross-section of the valve, the valve cannot be ejected out of the vessel, irrespective of the arrangements for connecting the piping to the vessel, and therefore the associated failures.

The analysis making it possible to demonstrate the safety of such an assembly is simple and robust.

This technical solution is adaptable to most existing types of valve. It is therefore possible to use standard valves or derivatives of catalog products to implement this technical solution.

The vessel may also have one or more of the features below, considered individually or according to any technical possible combination(s):
- said portion having an inner cross-section, perpendicular to the central axis, that is smaller than the outer cross-section of the valve is an obstacle formed in the material making up the wall;
- the inner end segment is connected to the outer end segment by a shoulder having an inner cross-section smaller than the outer cross-section of the valve;
- the vessel comprises a removable fastener for the valve, blocking the valve in position relative to the wall axially toward the inside of the vessel;
- the removable fastener fastens the valve to the wall;
- the removable fastener is of the bayonet type;
- the vessel includes an inner duct located in the inner volume and directly connected to the valve, the inner duct being in fluid communication with the piping through the valve, the inner duct being part of the removable fastener;
- the removable fastener includes a lock for locking the inner duct on another piece of inner equipment of the vessel;
- the removable fastener includes a lock for locking the inner duct on the wall, for example of the bayonet type;
- a resilient sealing gasket is inserted between the valve and the passage;
- a thermal protection sleeve is fastened to the valve, the thermal protection sleeve axially extending the valve and being engaged in the outer end segment.

According to a second aspect, a nuclear reactor is provided comprising a core and a vessel in which the core is arranged, the vessel having the above features.

BRIEF SUMMARY OF THE DRAWINGS

Other features and advantages of the present disclosure will emerge from the description thereof provided below, for information and non-limitingly, in reference to the appended figures, in which.

DETAILED DESCRIPTION

Figure 1:
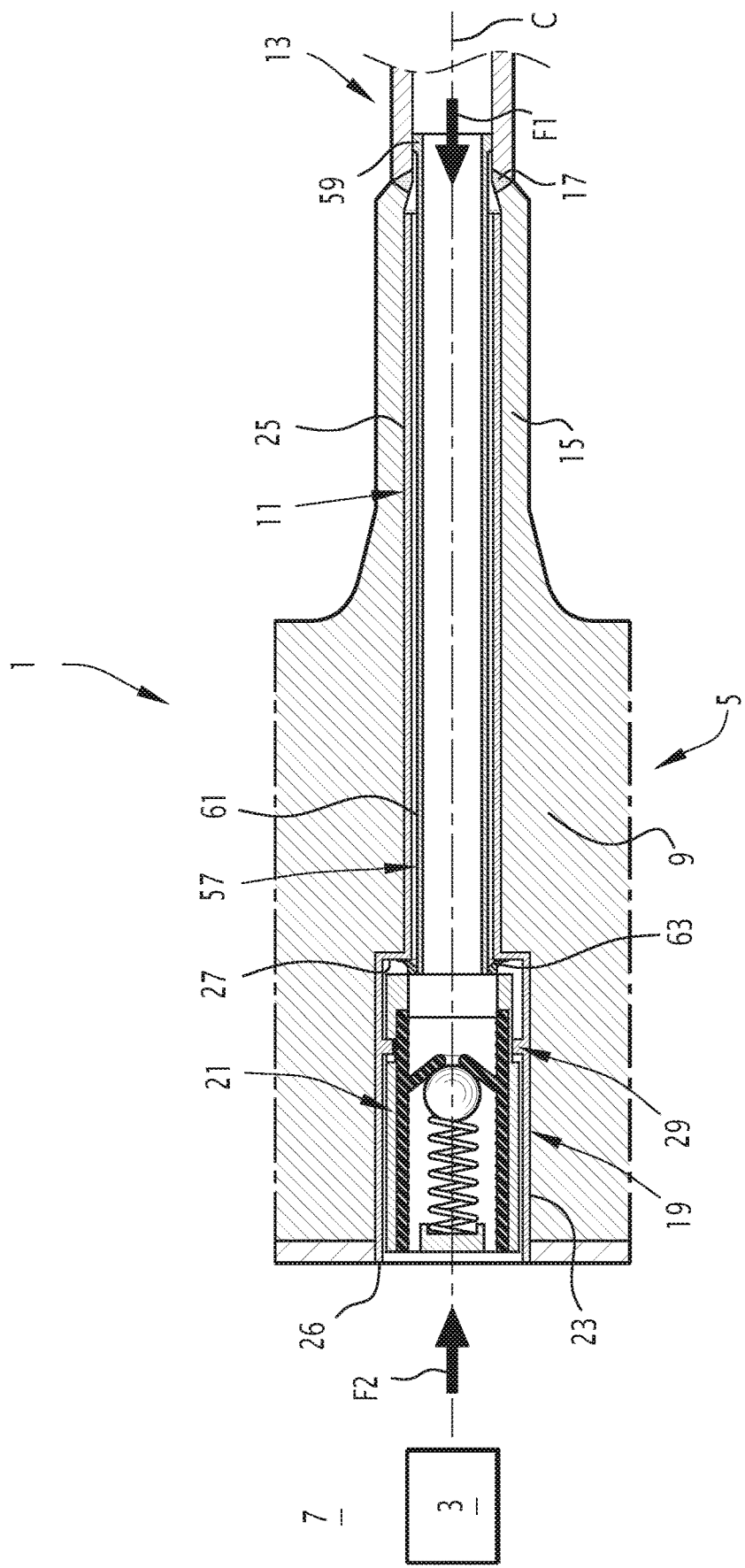
FIG. 1 is a partial cross-sectional view of a pressurized nuclear reactor vessel according to the present disclosure, taken perpendicular to the axis of the vessel.

The vessel 1 shown in FIG. 1 is integrated into a nuclear reactor. Typically, this vessel 1 contains the core 3 of the nuclear reactor. In a variant, the vessel 1 is not the vessel containing the core of the reactor, but is another vessel of the nuclear reactor. For example, the vessel is the pressurizer of the nuclear reactor, or even a vessel not belonging to the primary circuit of the nuclear reactor.

The nuclear reactor is typically of the integral type. In this case, the pressurized vessel contains the primary circuit. The vessel typically contains the primary pump(s), the heat exchanger(s) in which the primary fluid gives its heat to the secondary fluid, the pressurizer, etc.

Alternatively, the nuclear reactor is not of the integral type. The primary circuit then includes one or several primary loops, located outside the vessel.

The nuclear reactor is typically a pressurized water reactor. In a variant, the nuclear reactor is of any other suitable type.

The vessel 1 comprises a shell 5 delimiting an inner volume 7.

Typically, the shell 5 includes a shroud, the lower part of which is closed by a lower bottom and the upper part of which is closed by a removable cover. It generally has a vertical axis.

The shell 5 has a wall 9 traversed by at least one passage 11 having a central axis C.

The wall 9 is typically part of the shroud. In a variant, it is part of the cover or of the lower bottom.

The vessel 1 further includes a piping 13, outside the shell 5 and connected to the wall 9, the piping 13 fluidly communicating with the inner volume 7 through the passage 11.

The piping 13 is for example provided to inject a fluid into the vessel 1 (arrow F1 in FIG. 1). For example, the piping 13 is connected to the safety injection system of the nuclear reactor, provided to inject water in case of breaches on another line opening into the vessel.

In a variant, the piping 13 is provided to extract a fluid outside the vessel 1 (arrow F2 in FIG. 1). For example, the piping 13 is connected to the refrigeration system when stopped or to the system for checking the physicochemistry of the primary fluid.

According to another variant, the piping 13 is provided to circulate the fluid in both directions, either toward the inside of the vessel 1, or toward the outside of the vessel 1.

The vessel 1 typically includes a boss 15 toward the outside, on which the piping 13 is fastened. The piping 13 is typically fastened to the boss 15 by a weld 17.

The passage 11 passes all the way through the wall 9. It is delimited by the boss 15 at its outer end.

The passage 11 is typically rectilinear, its central axis C then being a straight line. For example, it extends radially relative to the axis of the vessel 1. The piping 13 extends the passage 11.

The inside of the passage 11 is preferably covered by a liner 19. This liner 19 covers the entire inner surface of the passage 11, and is pressed against said inner surface. It is provided to protect the inner surface of the passage from contact with the fluid circulating in the passage, so as to prevent corrosion. In a variant, the passage 11 does not include a covering.

The vessel 1 also comprises a valve 21 mounted in the passage 11.

The valve 21 is provided to selectively block a circulation of fluid between the inner volume 7 and the piping 13 through the passage 11. Depending on the system to which the piping 13 is connected, the valve 21 is designed to block the circulation of fluid:

either only when the fluid flow rate from the inner side toward the outer side of the valve is above a determined value;

or when the fluid flow rate from the inner side toward the outer side of the valve is above a determined value and when the fluid flow rate from the outer side toward the inner side of the valve is above another determined value.

In the first case, the valve operates as a check valve. In the second case, the valve is of the dynamic type.

Here, the inner and outer sides of the valve refer to the sides respectively facing toward the inside of the vessel and toward the piping.

The valve is either of the normally open type, or the normally closed type.

The valve 21 is of any suitable type: ball, valve, butterfly, flap, etc.

The passage 11 has an inner end segment 23 that opens into the inner volume 7 and an outer end segment 25 that opens into the piping 13, the valve 21 being housed in the inner end segment 23.

The valve 21 has a given outer cross-section taken perpendicularly to the central axis C.

The inner end segment 23 has, over its entire axial length, an inner cross-section perpendicular to the central axis C that is larger than the outer cross-section of the valve 21, such that the valve 21 is capable of being extracted from the passage 11 through the inside of the vessel 1.

The outer cross-section of the valve 21 can be the same over the entire axial length of this valve. In a variant, the outer cross-section of the valve varies axially along this valve. In the latter case, the largest outer cross-section is considered here.

The inner cross-section of the inner end segment 23 can be the same over the entire axial length of this segment. In a variant, the inner cross-section of the inner end segment varies axially along this segment. In the latter case, the smallest inner cross-section is considered here.

The outer cross-section of the valve can have the same shape as the inner cross-section of the inner end segment 23 (both circular, for example), or on the contrary a different shape (one circular and the other not). In any case, the shape and the size of the inner cross-section and the outer cross-section are chosen so that the valve can be moved in one piece, from its normal position to the opening 26 of the inner end segment 23 opening into the inner volume 7.

The outer end segment 25 has at least one portion having an inner cross-section, perpendicular to the central axis C, that is smaller than the outer cross-section of the valve 21, such that the valve 21 cannot be ejected out of the vessel 1.

The outer end segment 25 has said smaller inner cross-section, smaller than the outer cross-section of the valve 21, over its entire axial length, as illustrated in FIG. 1. In a variant, it only has said smaller inner cross-section over part of its length, for example at its inner end facing toward the inside of the vessel.

The outer cross-section of the valve can have the same shape as the inner cross-section of the outer end segment 25 (both circular, for example), or on the contrary a different shape (one circular and the other not). In any case, the shape and the size of the inner cross-section and the outer cross-section are chosen so that the valve can be moved in one piece, under the effect of an overpressure inside the vessel 1, from its normal position to the outer end of the segment 25, that is to say the end connected to the piping 13.

It is considered here that the inner end segment 23 corresponds to the part of the passage 11 extending from the opening 26 of the passage 11 to the end of the valve opposite the opening. It is considered here that the outer end segment 25 corresponds to the part of the passage 11 extending from the portion of the passage 11 having a reduced cross-section to the end of the passage 11 connected to the piping 13.

In the illustrated example, the inner and outer end segments 23, 25 together cover the entire length of the passage 11. In a variant, an intermediate segment is inserted between the inner and outer segments.

Thus, said portion having an inner cross-section, perpendicular to the central axis C, that is smaller than the outer cross-section of the valve 21 is an obstacle formed in the material making up the wall 9.

It forms an obstacle in that it prevents the valve 21 from passing toward the outside of the passage 21. This obstacle is particularly solid because it is formed by the wall itself.

Advantageously, the inner end segment 23 is connected to the outer end segment 25 by a shoulder 27 having an inner cross-section smaller than the outer cross-section of the valve 21.

Thus, in case of overpressure inside the vessel 1, the valve 21 bears against the shoulder 27 and cannot be ejected out of the passage.

The shoulder 27 is formed in the material making up the wall 9.

Preferably, the vessel 1 comprises a removable fastener 29 for the valve 21, blocking the valve 21 in position relative to the wall 9 axially toward the inside of the vessel 1.

Thus, the removable fastener 29 prevents the valve 21 from falling into the vessel 1 involuntarily, for example under the effect of the flow rate induced by the injection of water into the vessel via the piping 13.

The removable fastener 29 can be made in different ways.

According to a first variant embodiment, the removable fastener 29 fastens the valve 21 to the wall 9. It fastens the valve directly to the wall 9, or to the liner 19, which in turn is secured to the wall 9.

Figure 2:
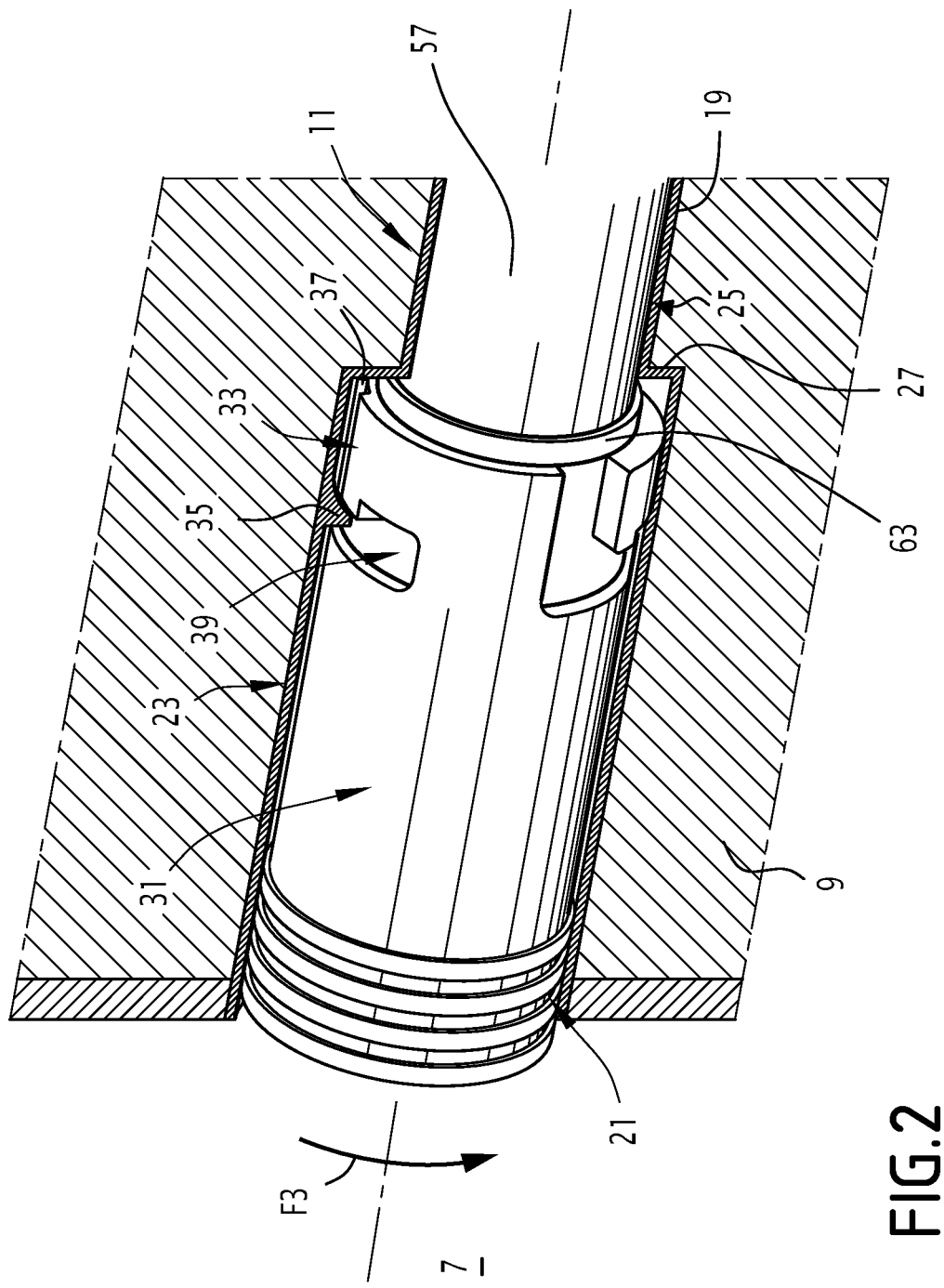
FIG. 2 is a partial cross-sectional perspective view, more particularly showing a first variant embodiment of the removable fastener of the valve of FIG. 1.

The removable fastener 29 is for example of the bayonet type, as illustrated in FIGS. 1 and 2. In this case, the outer surface 31 of the valve comprises L-shaped grooves 33, the liner 19 bearing fingers 35 engaged freely sliding in the grooves 33.

Each groove 33 has a straight segment 37 extending axially, and a circumferential segment 39 extending in an arc of circle about the central axis C. The straight segment 37 opens at an axial end facing toward the piping 13, in order to be able to insert and extract the finger 35. The circumferential segment 39 extends the straight segment 37 from an end thereof facing toward the inner volume of the vessel. All of the circumferential segments 39 are oriented in the same direction from the corresponding straight segment 37.

Thus, the valve can be disassembled by first turning it about the central axis C along the arrow F3 of FIG. 2, then by moving it axially toward the inside of the vessel 1. The assembly is done in the opposite direction.

Figure 3:
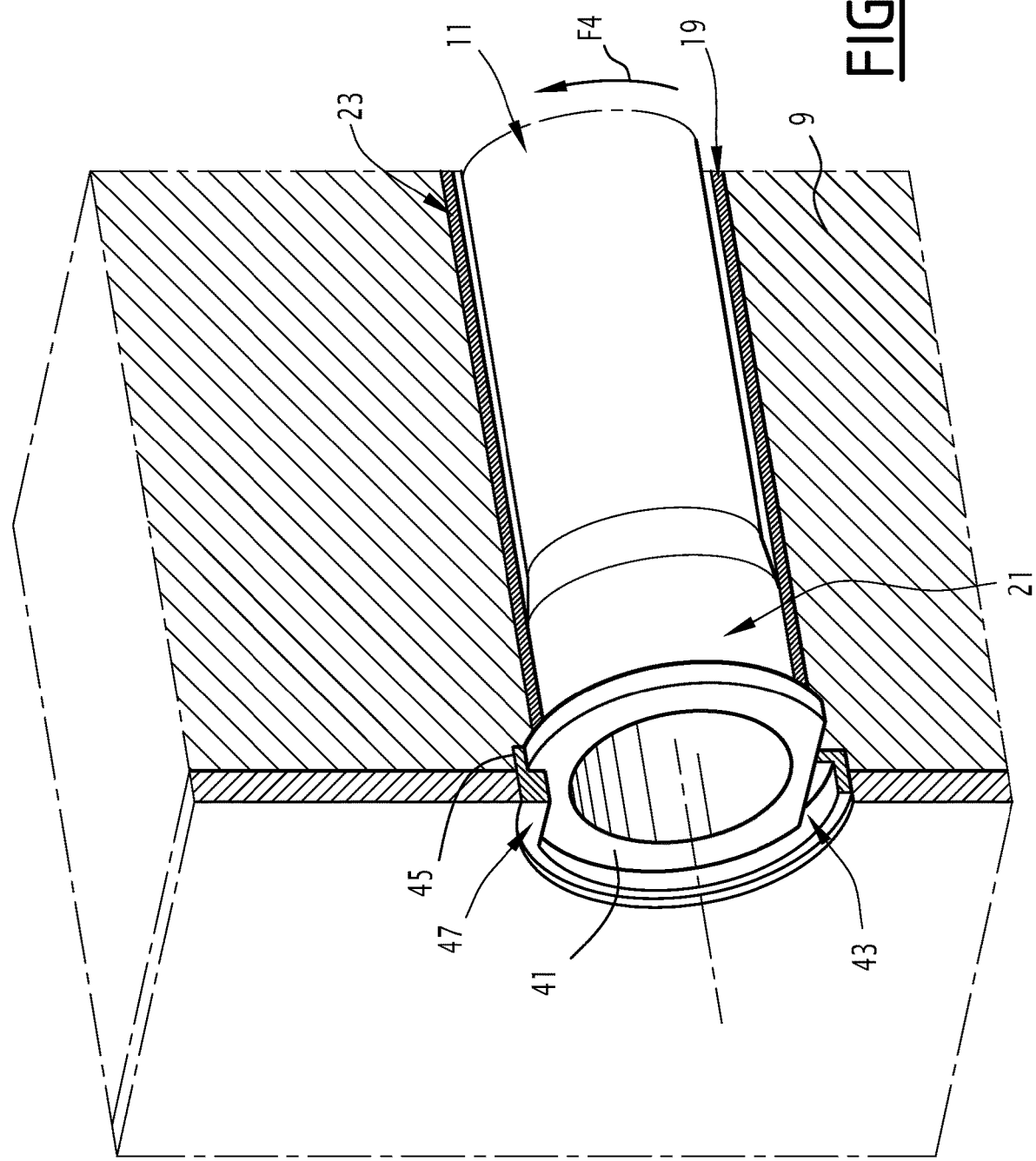
FIG. 3 is a partial cross-sectional perspective view, more particularly showing a second variant embodiment of the removable fastener of the valve of FIG. 1.

Alternatively, the removable fastener 29 is of the type illustrated in FIG. 3. The valve bears, at its inner end, a protruding skirt 41, the outer edge of which is cut along a cord 43.

The inner opening of the passage 11 is surrounded by a spot facing 45. The liner 19 extends inside the spot facing 45 and forms a retaining groove 47 in a sector of the spot facing 45.

The protruding skirt 41 is normally placed in the spot facing 45, a sector of the skirt being engaged in the retaining groove 47. The retaining groove 47 prevents the valve 21 from moving toward the inside of the vessel.

The valve can be disassembled by first turning it about the central axis C along arrow F4 of FIG. 3, in order to move the cut sector of the skirt in line with the retaining groove 47. The valve can next be moved axially toward the inside of the vessel 1. The assembly is done in the opposite direction.

Figure 4:
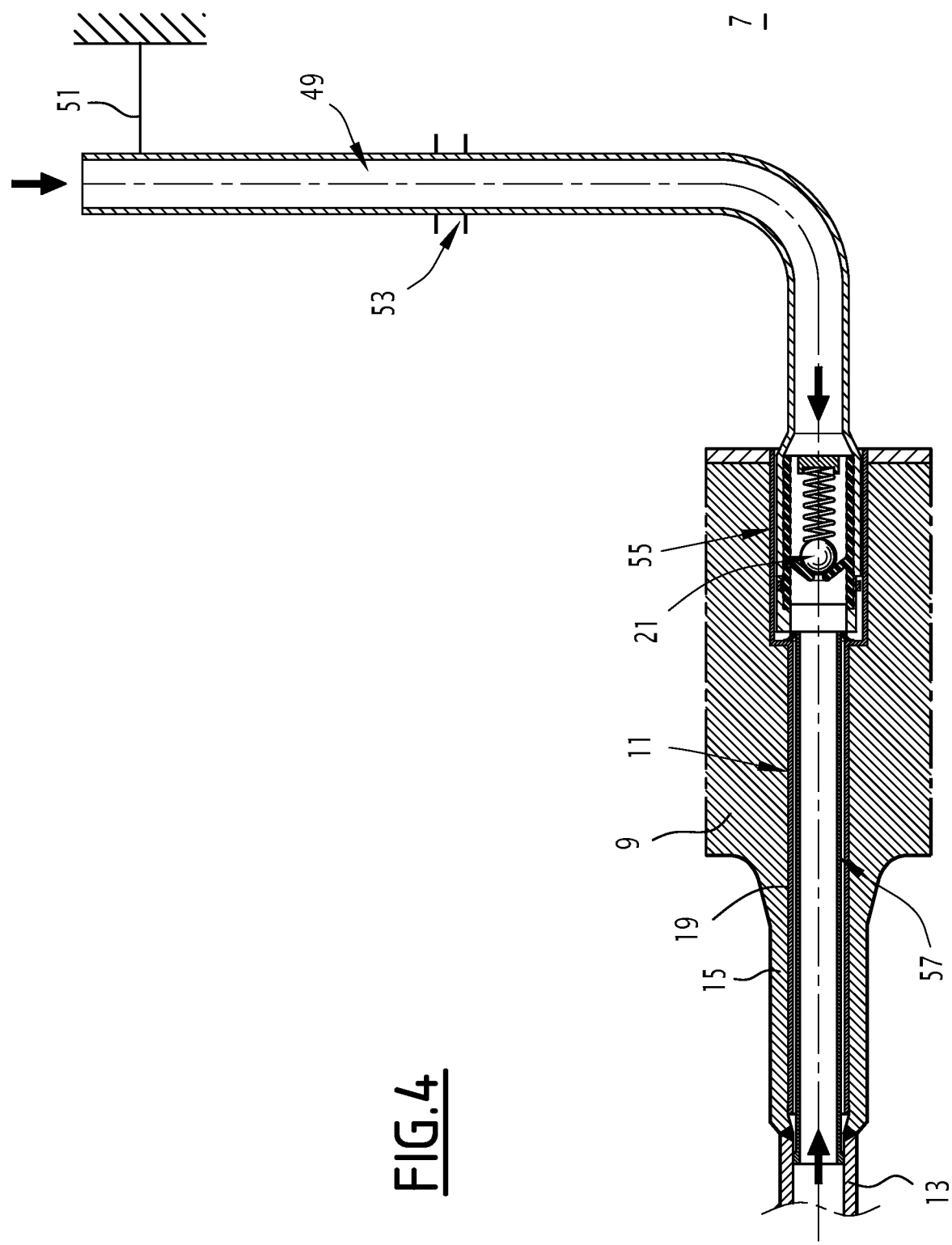
FIG. 4 is a partial cross-sectional view of the pressurized vessel of a nuclear reactor according to the present disclosure, taken in a plane containing the axis of the vessel, more particularly showing an inner duct participating in blocking the valve in position.

According to a variant embodiment, the vessel 1 includes an inner duct 49 located in the inner volume 7 and connected directly to the valve 21 (FIG. 4). The inner duct makes it possible to transfer the fluid leaving the valve to another point of the vessel 1, or on the contrary to conduct the fluid from said other point of the vessel to the valve 21.

The inner duct 49 is in fluid communication with the piping 13 through the valve 21.

The inner duct 49 is advantageously part of the removable fastener 29.

To that end, the removable fastener 29 preferably includes a lock 51 for locking the inner duct 49 on another piece of inner equipment of the vessel 1. For example, it is fastened to the shell 5. Thus, the valve is blocked in the passage 11 by the inner duct 49, which in turn is kept in position relative to the wall 9 by the lock 51.

Alternatively or in addition, the removable fastener 29 includes a lock 55 for locking the inner duct 49 on the wall 9, for example of the bayonet type. For example, the end of the inner duct 49 connected to the valve 21 is engaged in the passage 11. This end is fastened to the wall by a bayonet of the same type as that described above.

The removable fastener 29 comprises one or several of the devices described above. For example, it comprises the bayonet or skirt fastener for fastening the valve 21 to the wall 9, plus the inner duct 49 equipped with the lock 51 and/or the lock 55.

The removable fastener can also be of any other suitable type: coupler, fire department connection, obstacle arranged in the inner volume 7 of the vessel 1 that may or may not be exclusively dedicated to blocking the valve, etc.

Advantageously, an interface 53 is provided allowing the gripping and handling of the valve 21. This interface is for example arranged on the valve 21, or on the inner duct 49, or in any other appropriate location.

The gripping interface is of any suitable type.

According to still another embodiment of the removable fastener 29, the valve 21 is kept in its housing 23 by the positioning in the vessel 1 of an inner that prevents the valve from entering the vessel under the effect of the water injection flow rate. The inner is typically an upper inner or a basket. It is arranged opposite and near the opening 26 of the inner end segment 23.

Preferably, a thermal protection sleeve 57 (FIG. 1) is fastened to the valve 21. The thermal protection sleeve 57 axially extends the valve 21 and is engaged in the outer end segment 25.

Its free end 59 is engaged in the piping 13. This free end is pressed against the inner surface of the duct. A fluid knife 61 thus surrounds the valve 21 and the sleeve 57. It thermally insulates the inner surface of the passage 11 from the fluid circulating in the piping 13 and in the passage 11. It in particular protects the weld 17 from thermal shocks that may be caused by the circulation of relatively cold fluids.

The sleeve 57 is secured to the valve 21 and forms a removable subassembly in one piece therewith.

Advantageously, a resilient sealing gasket 63 is inserted between the valve 21 and the passage 11.

This sealing gasket is of any suitable type: with deformable lip, bellows, etc.

The seal is borne either by the valve 21, or by the thermal protection sleeve 57, or by the inner surface of the passage 11, or by the liner 19.

The sealing gasket 63 performs several functions.

It ensures relative sealing between the valve 21 and the inner surface of the passage 11 or the liner 19. It makes it possible to take up the thermal expansions of the parts. It limits, by friction, the movement of the valve relative to the wall 9, and therefore limits the risk of untimely disengagement of the removable fastener 29.

What is claimed is:

1. A pressure vessel for a nuclear reactor, the vessel comprising:
    a shell delimiting an inner volume of the pressure vessel and separating the inner volume from an outside of the pressure vessel, the shell having a wall traversed by at least one passage having a central axis;
    a piping outside the shell and connected to the wall, the piping fluidly communicating with the inner volume through the passage;
    a valve mounted in the passage and provided to selectively block a circulation of fluid between the inner volume and the piping through the passage, the valve having a given outer cross-section perpendicularly to the central axis;
    the passage having an inner end segment that opens into the inner volume and an outer end segment that opens into the piping, the valve being housed in the inner end segment;
    the inner end segment having, over its entire axial length, an inner cross-section perpendicular to the central axis that is larger than the outer cross-section of the valve, such that the valve is configured for being extracted from the passage through an inside of the vessel;
    the outer end segment having at least one portion having an inner cross-section, perpendicular to the central axis, that is smaller than the outer cross-section of the valve, such that the valve cannot be ejected out of the vessel; and
    a thermal protection sleeve is fastened to the valve, the thermal protection sleeve axially extending the valve and being engaged in the outer end segment,
    wherein a free end of the thermal protection sleeve is engaged in the piping, a fluid knife surrounding the sleeve and thermally insulating an inner surface of the passage for the fluid circulating in the piping and in the passage.

2. The vessel according to claim 1, wherein the portion having an inner cross-section, perpendicular to the central axis, that is smaller than the outer cross- section of the valve is an obstacle formed in the material making up the wall.

3. The vessel according to claim 1, wherein the inner end segment is connected to the outer end segment by a shoulder having an inner cross-section smaller than the outer cross-section of the valve.

4. The vessel according to claim 1, wherein the vessel comprises a removable fastener for the valve, blocking the valve in position relative to the wall axially toward the inside of the vessel.

5. The vessel according to claim 4, wherein the removable fastener fastens the valve to the wall.

6. The vessel according to claim 5, wherein the removable fastener is a bayonet type fastener.

7. The vessel according to claim 4, wherein the vessel includes an inner duct located in the inner volume and directly connected to the valve, the inner duct being in fluid communication with the piping through the valve, the inner duct being part of the removable fastener.

8. The vessel according to claim 7, wherein the removable fastener includes a lock for locking the inner duct on another piece of inner equipment of the vessel.

9. The vessel according to claim 7, wherein the removable fastener includes a lock for locking the inner duct on the wall.

10. The vessel according to claim 1, further comprising a resilient sealing gasket inserted between the valve and the passage.

11. The vessel according to claim 1, wherein a core of the nuclear reactor is contained inside the pressure vessel.

12. The vessel according to claim 1, wherein the inner cross-section of the inner end segment is the same over an entire length of the inner end segment.

13. The vessel according to claim 1, wherein the piping is welded to the shell.

14. The vessel according to claim 1, wherein the valve is entirely accommodated in the passage.

* * * * *